Jan. 20, 1931.  R. R. PARRY  1,789,321
DRINKING GLASS WASHING APPARATUS
Filed Jan. 15, 1926  4 Sheets-Sheet 1
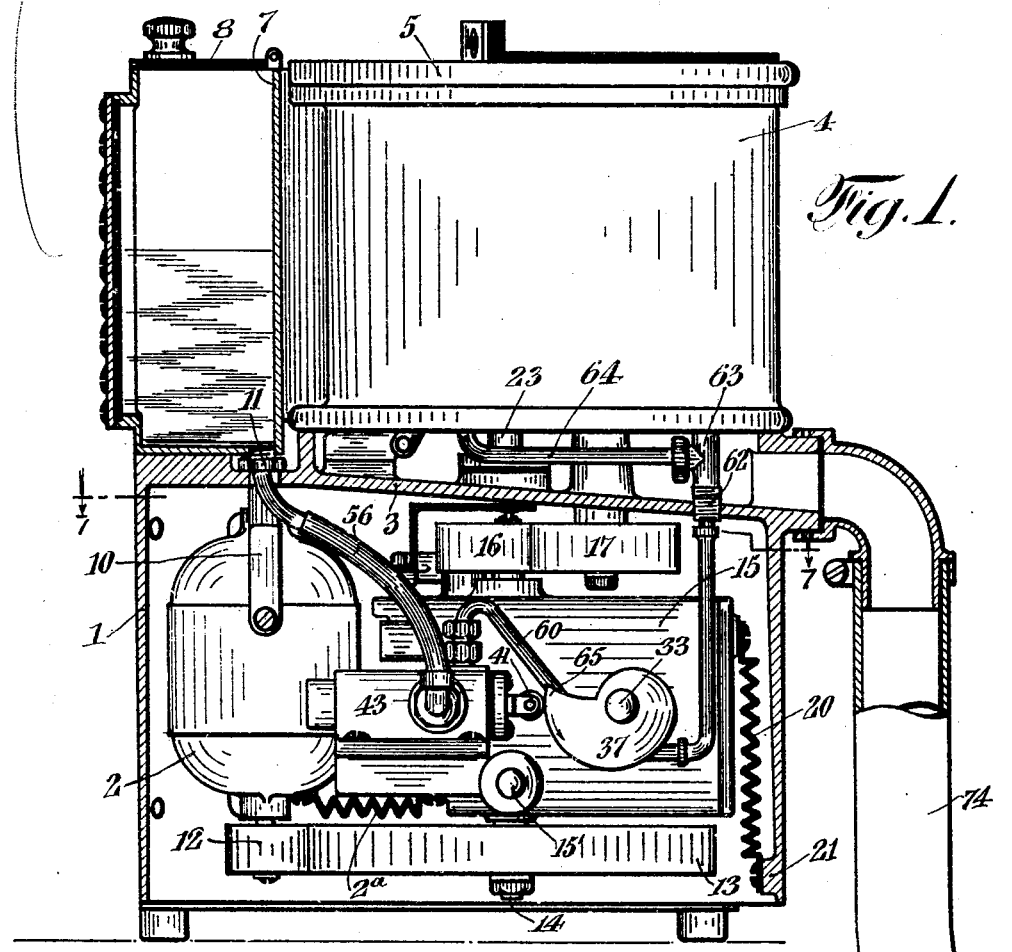
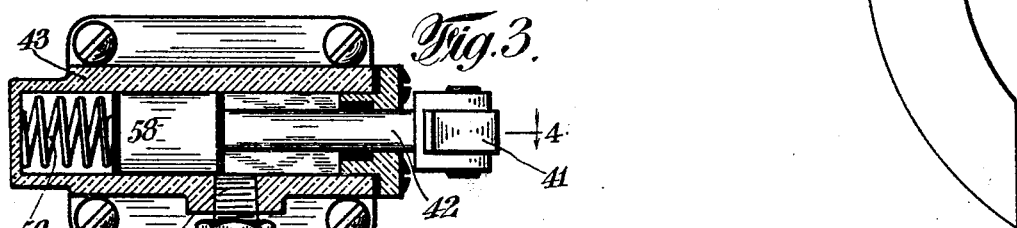
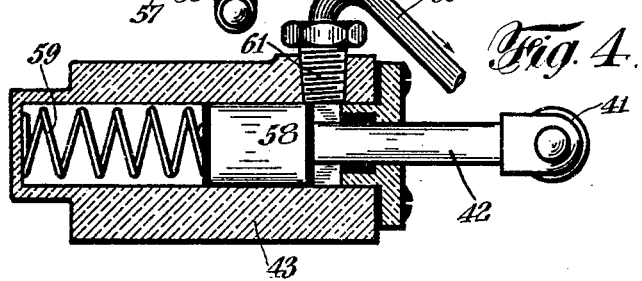
INVENTOR.
Robert R. Parry
BY Ward, Crosby and Smith
His ATTORNEYS.

Jan. 20, 1931.    R. R. PARRY    1,789,321
DRINKING GLASS WASHING APPARATUS
Filed Jan. 15, 1926    4 Sheets-Sheet 2
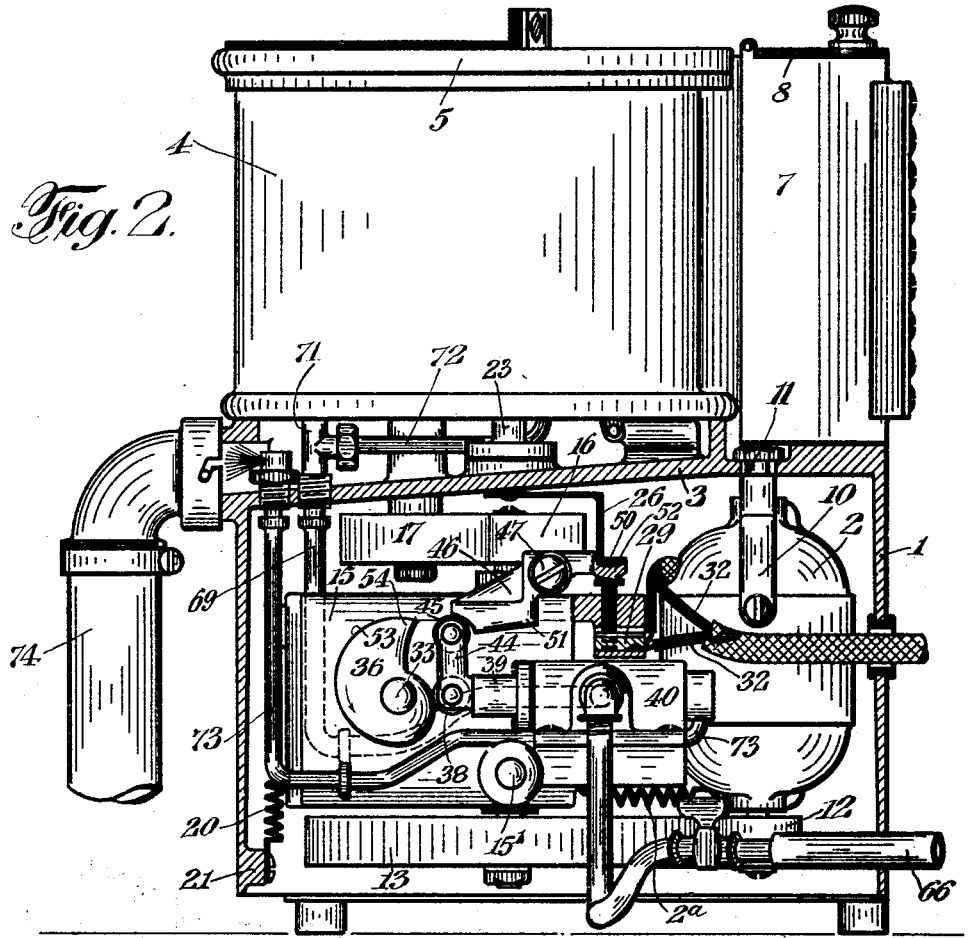
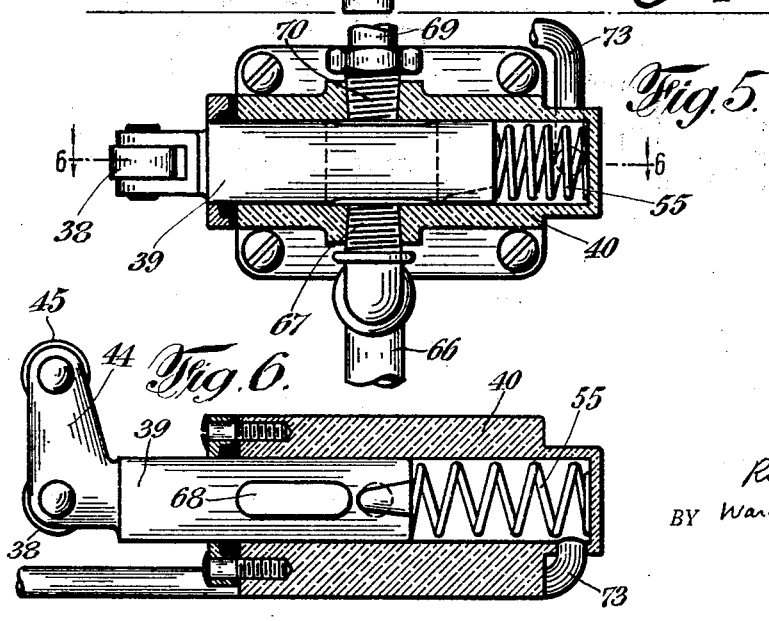
INVENTOR.
Robert R. Parry
BY Ward, Crosby and Smith
His ATTORNEYS.

Jan. 20, 1931.  R. R. PARRY  1,789,321
DRINKING GLASS WASHING APPARATUS
Filed Jan. 15, 1926   4 Sheets-Sheet 3
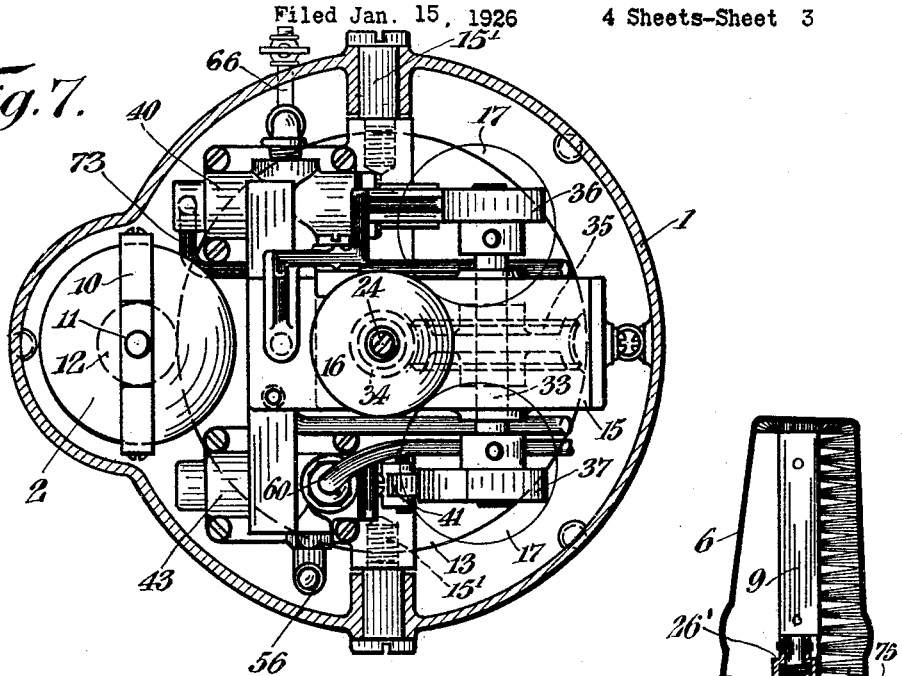
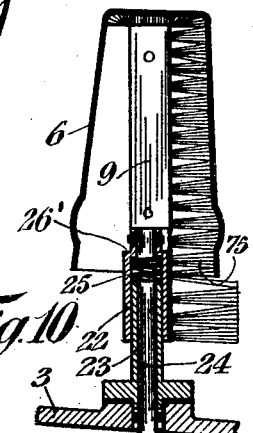
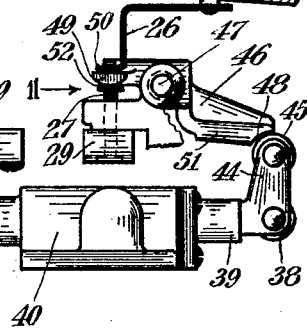
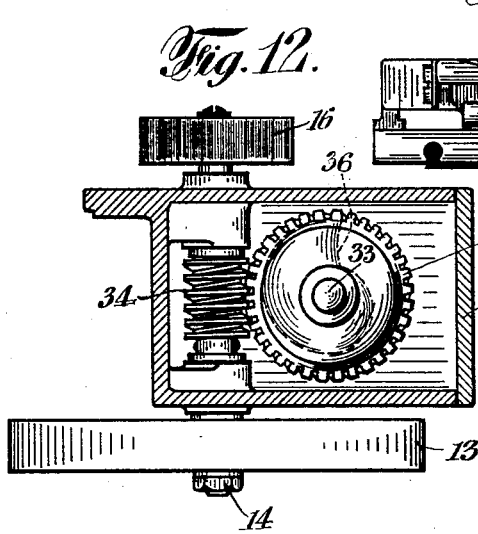
INVENTOR.
Robert R. Parry
BY Ward, Crosby and Smith
His ATTORNEYS.

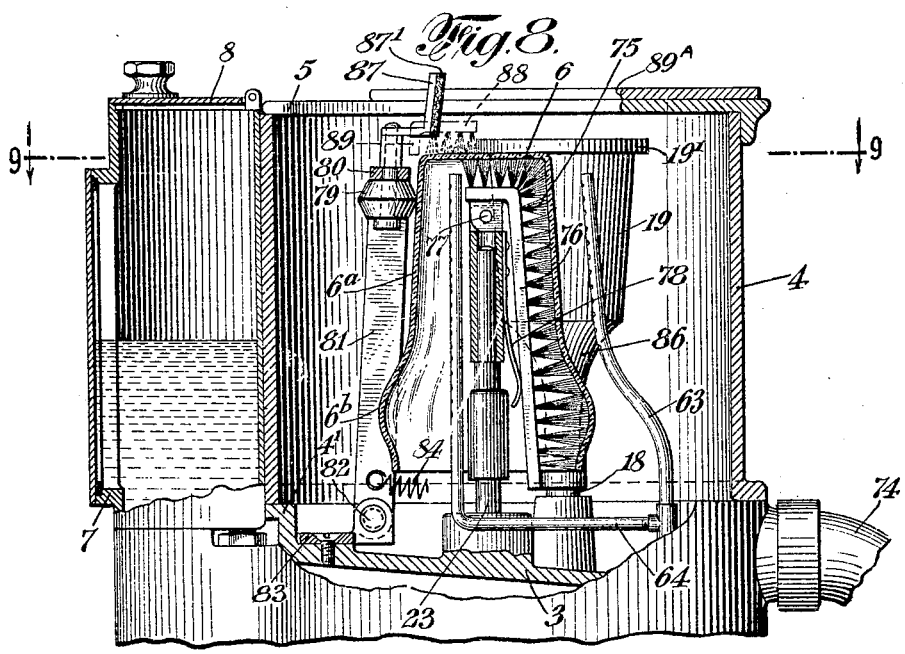

Patented Jan. 20, 1931

1,789,321

UNITED STATES PATENT OFFICE

ROBERT R. PARRY, OF FOREST HILLS, NEW YORK

DRINKING-GLASS-WASHING APPARATUS

Application filed January 15, 1926. Serial No. 81,382.

The invention relates to drinking glass washing apparatus and more particularly to apparatus whereby a tumbler or drinking glass may be effectively and quickly washed by an automatic mechanism. The invention is in some respects an improvement upon that described and claimed in my application "Drinking glass washing apparatus", Serial No. 35, filed Jan. 2, 1925 which has matured into Patent No. 1,662,205, granted March 13, 1928.

In accordance with the present invention an automatic machine is provided into which individual drinking glasses of various shapes may be readily inserted and effectively cleansed in a few seconds by automatic devices.

A motor is started in operation upon the placing of the glass within the apparatus and this results in causing relative movement between the glass and suitable brush means for a limited time, this preferably being done by causing the glass to revolve in contact with stationary brush means.

One feature of the invention consists in the provision of automatic means whereby a limited quantity of soap solution is first projected against the inner and outer surfaces of the glass, after which a quantity of clean water is projected against the surfaces of the glass, these two operations taking place, one after the other, during the period the glass is permitted to rotate. By this action the glass will be thoroughly scoured with the soap solution, and the soap solution and dirt will then be thoroughly washed off by the water which follows the soap solution. The motor is preferably stopped automatically at the end of a predetermined interval after it has been placed in operation by the insertion of the glass in the machine.

Objects of the invention consist in the provision of various improved features of construction and combinations of parts including improvements in the mounting of the brush means, and features relating to the mounting and arrangement of various parts of the construction to provide an effective and comparatively simple device of the character mentioned.

The invention consists in the apparatus, parts thereof and combinations of elements all as will be more fully described in the following specification and particularly pointed out in the appended claims.

In order that the invention may be more clearly understood attention is hereby directed to the accompanying drawings forming part of this application and illustrating one form of the invention.

Referring to the drawings, Figure 1 is a view partly in side elevation and partly in section of an apparatus comprising the invention;

Fig. 2 is a view partly in section and partly in side elevation viewed from the opposite side of the machine to that shown in Figure 1;

Fig. 3 is an enlarged sectional detail showing the cylinder and plunger for injecting the soap solution shown in Figure 1;

Fig. 4 is a sectional view taken on line 4—4 of Fig. 3, the plunger, however, being in a different position;

Fig. 5 is an enlarged sectional detail showing the cylinder and plunger therein for projecting the water as shown in Fig. 2;

Fig. 6 is a section taken on line 6—6 of Fig. 5, the parts however being in a different position;

Fig. 7 is a horizontal section taken on line 7—7 of Figure 1;

Fig. 8 is a vertical section through the upper part of the apparatus shown in Figure 1;

Fig. 9 is a horizontal section taken on line 9—9 of Fig. 8;

Fig. 10 is an enlarged vertical view partly in section and partly in partial side elevation illustrating the means for starting the motor in operation when the tumbler is inserted in position;

Fig. 11 is a fragmentary view illustrating a portion of the mechanism for starting the motor in operation, this being an elevation of parts of the mechanism shown in Fig. 10 looking in the direction of the arrow 11 in Fig. 10;

Fig. 12 is a partial view partly in side elevation and partly in vertical section, illustrating portions of the driving connections;

and Fig. 13 is a partial perspective view of part of the brush mechanism.

Referring to the drawings, the machine is shown as comprising a casing 1 in which the motor 2 is mounted and in which various operating mechanism is contained. Casing 1 is provided with a top closure member 3 upon which is mounted a casing 4, which rests on flange 4' of partition 3, and which may be provided with a top 5. A tumbler such as the tumbler indicated at 6 in Fig. 8 may be positioned within casing 4, in the manner which will be described to be washed and cleansed. Soap solution is contained within a compartment 7 at one side of the tumbler washer compartment 4, this soap solution compartment being shown as provided with a cover 8.

In the operation of the device, a tumbler such as tumbler 6 is inserted in inverted position upon a support 9 in compartment 4 and momentarily pressed down, whereupon motor 2 will be automatically started into rotation. This rotation of the motor results in rotating the tumbler by frictional means, the inner and outer surfaces of the tumbler being engaged by suitable brush means. A definite limited quantity of soap solution from container 7 will be projected into engagement with the inner and outer surfaces of the tumbler which will be thoroughly cleansed thereby as the tumbler engages with the inside and outside brush means. Clean water from a suitable supply will then be projected over the inner and outer surfaces of the tumbler washing off the soap solution and entrained dirt, and at the end of a suitable short period the motor will automatically stop, whereupon the cleansed glass may be lifted out of the machine.

Reference will first be made to the mounting of the motor and the means for rotating the tumbler therefrom. Motor 2 is preferably pivotally suspended by a yoke 10, the lower ends of which are pivotally secured to the opposite sides of the motor. The yoke is suspended by a bolt 11 from the partition or upper wall 3 which forms the top of the lower or motor compartment 1 of the apparatus.

The lower end of the motor shaft carries a rotatable member such as a disc 12 which may be formed, for example, of rubber and which engages frictionally with a fly-wheel disc 13 secured on the lower end of a shaft 14 which extends upwardly through a casing 15, in the upper and lower walls of which shaft 14 is supported. Casing 15 itself is pivotally supported on a pair of short horizontal stub shafts 15', 15' which are supported in the outer casing 1. The disc 12 is held in engagement with disc 13 by means of spring 2$^a$, which connects the lower end of the motor with casing 15.

Vertical shaft 14 is provided at its upper end with a friction roller 16 which frictionally engages and drives a pair of rollers 17, 17, rollers 16 and 17 being mounted immediately below the transverse partition 3 of the frame structure.

Rollers 17 are mounted upon vertical shafts 18, 18 which carry rotatable members 19, 19 which are adapted to frictionally engage against the outer surface of the tumbler, 6, to rotate the same. These rotatable members 19, 19, bear against the outer surface of the tumbler in the manner indicated in Fig. 9, the tumbler being pressed into engagement therewith by means which will be described hereafter. The tumbler will be rotated about the stationary support 9, upon which the same rests, so long as the motor continues in operation.

The casing 15, as stated, is pivotally mounted upon the horizontal stub shafts 15', 15', which as is shown in Fig. 1, are positioned adjacent to the lower part of casing 15, intermediate the ends of the same. A spring 20, (Fig. 1) is connected at its upper end to the right hand of casing 15, referring to Fig. 1, at a point above the horizontal plane in which pivots 15', 15' are located. The lower end of this spring is secured to a boss 21 on frame 1. This spring tends to swing casing 15 in a clockwise direction, referring to Fig. 1, about its pivots 15', 15', thus resulting in holding the roller 16 constantly in firm engagement with the two rollers 17, 17 with which it engages.

The manner in which the motor, 2, is automatically started in operation when the tumbler is inserted into the machine will now be described. The vertical support 9 upon which the tumbler is positioned may be formed as a hollow shell (Fig. 10) which has a lower portion 22, slidably mounted upon a hollow vertical post 23. This latter extends upwardly from horizontal frame member 3. A vertical stem 24 extends through the hollow post 23 and into the supporting sleeve 9 to which it is fixedly secured. Support 9 and stem 24 are normally held in a raised position by suitable spring means such as the spring 25 which is shown as wound around stem 24 with the lower end of the spring resting upon the upper end of the fixed post 23 while the upper end of the spring bears against a shoulder 26' at the upper end of the portion, 22, of the tumbler support 9.

When the tumbler is placed upon support 9 and pressed downwardly, support 9 and stem 24 will be depressed against the resistance of spring 25. Stem 24 extends through a suitable opening in frame member 3 and is connected at its lower end to a link 26, which is shown as having a horizontal portion and a vertical extension.

The depression of member 26 results in closing contacts whereby a circuit is completed for putting the motor in operation. The vertical pin 27, forming a downwardly-extending continuation of the vertical portion of link 26, extends through an opening, 28, in a member 29, extending horizontally from casing 15, reference being made to Figs. 11 and 2. The lower end of pin 27 bears against a contact spring 30 which is secured to the lower side of the extension 29 of casing 15, contact spring 30 being normally out of engagement with contact spring 31, which is also secured to frame member 29. The result of depressing support 9, when a tumbler is placed thereon, is accordingly to depress spring 30 into contact with spring 31.

The feed-circuit for motor 2 is thereby closed and the motor is started in operation, this feed-circuit being indicated by connections 32, shown in Fig. 2.

One result of the starting of the motor will be the rotation of the cam shaft 33. Shaft 33 is horizontally mounted in casing 15 and is rotated from the vertical shaft 14, by the engagement of a worm 34 on shaft 14 with the worm wheel 35 on shaft 33.

Shaft 33 carries a cam 36, at one end thereof and cam 37 at the other end, reference being made to Figs. 1, 2 and 7. Cam 36 engages with a roller 38 mounted on one end of a plunger 39 which reciprocates in a cylinder 40 while cam 37 co-acts with a roller 41 mounted on one end of a plunger 42 which reciprocates in a cylinder 43. Cam 37 controls operation of the devices for projecting soap solution while cam 36 controls the operation of the devices for subsequently projecting clean water on the tumbler, as will be presently described.

The motor preferably is only started in operation when the tumbler is placed in the machine, and preferably a slight downward pressure of the hand as the tumbler is dropped in position is required to cause contact 30 to engage contact 31 to complete the motor feed-circuit. Means by which this circuit will be maintained closed, for a sufficient length of time will now be described. An upwardly extending arm 44 is provided at the end of plunger 39 (Fig. 2, 6 and 10) and this arm carries a roller 45 at its upper end. A member 46 is pivoted, intermediate its ends, on a horizontal pivot 47 which is supported from, and above, the casing 15. One end of member 46 is provided with a curved portion 48 with which roller 45 normally engages when the motor is at rest.

On the opposite side of the pivot 47 there is provided a shoulder 49 through an opening in which extends the pin 27, previously referred to, which serves to press contact 30 into engagement with contact 31 when the glass is placed in position to be washed. Link member 26, which is operatively secured to pin 27, has an offset portion 50, at its lower end, which bears on shoulder 49 as is indicated in Fig. 10. Accordingly when link 26 is depressed, at the time the motor is started in operation, pressure of portion 50 of link 26 upon shoulder 49 of the pivoted member 46 will result in swinging member 46 about pivot 47, so as to swing the right hand end of member 46 upwardly (referring to Fig. 10). Plunger 39 will then be pressed into its cylinder 40 by rotation of cam 36 in a counterclockwise direction (Fig. 2) and accordingly roller 45 will ride along in contact with the lower surface 51 of one arm of pivoted member 46. This serves to hold the said arm of member 46 in its raised position while the other arm of member 46 is accordingly held depressed. The shoulder 49 on lever 46 will press downwardly upon the shoulder 52 of the pin 27. This will result in the motor circuit being closed at contacts 30, 31, while roller 45 rides along the lower surface 51 of member 46.

The movement of roller 45 along surface 51 will continue while cam 36 rotates in a counterclockwise direction from the position in Fig. 2, the roller 38 engaging with the curved surface 53 of the cam 36. When the roller 45 reaches the end of surface 51 of member 46, roller 38 will ride off of the end, 54, of surface 53 of cam 36. Thereupon the spring 55 in cylinder 40 will force plunger 39 outwardly from its intermost position, shown in Fig. 5 to its outermost position shown in Fig. 6. This will return roller 45 into the position shown in Figs. 2 and 10, in which roller 45 comes into engagement with curved surface 48 on lever 46. This results in the left hand end of member 46 rising (Fig. 10), as the right hand end of member 46 drops when roller 45 comes into engagement with the cutout portion 48 of member 46. Contact spring 30 will accordingly spring upwardly out of contact with spring 31 and the motor will accordingly stop, the rotation of the motor having continued throughout one revolution of cam 36. The action of lever 46 just described can be readily accomplished as in the preferred construction, by having the right hand end of lever 46 referring to Fig. 10 over-balance the left hand end of this lever.

The means by which the soap solution and water are projected on the tumbler will now be described. The soap solution in chamber 7 is adapted to flow through tube 56, Fig. 1, into cylinder 43 by means of the opening 57 therein, to which tube 56 is connected. The plunger 42 is connected to, or integral with, piston 58 in the cylinder. A spring 59 in the cylinder bears against the end of the piston 58 opposite to that to which the plunger 42 is connected, this spring tending to force the piston from its Fig. 3 position to its Fig. 4 position.

A pipe connection 60 extends from a suitable connection with an opening 61 at the right hand end of cylinder 43 as shown in Figs. 1 and 4. This pipe connection 60 extends upwardly as shown at 62 through the frame member 3 and through the bottom of the upper chamber 4 in which the tumbler is positioned. This pipe connection divides above partition 3 into two branches, one of which, 63, extends upwardly (Fig. 8) and is provided with perforations directed toward the outer surface of the tumbler, when the latter is mounted in position. The other branch of this pipe connection, 64, extends upwardly inside the tumbler 6 when the latter is mounted in position and is provided with perforations as shown through which soap solution will be projected against the inner surface of the tumbler.

At the moment when the motor starts in operation cam 37 and roller 41 will be in the position shown in Figs. 1 and 3, in which piston 58 is at the limit of its inward movement, spring 59 is compressed, and opening 57 from the soap solution reservoir is uncovered by piston 58. This position of the parts has been reached at the end of the previous operation of the motor. Accordingly a quantity of soap solution has flowed into cylinder 43, equal to or less than the capacity of cylinder 43 to the right of piston 58 in its Fig. 3 position. When, now, the motor is started, roller 41 will immediately ride off of the end 65 of the curved peripheral surface of cam 37. Spring 59 now rapidly forces piston 58 from the position shown in Fig. 3 to that shown in Fig. 4. This closes opening 57 from the soap chamber and projects the soap solution in cylinder 43 through pipe connections 60, 63 and 64, which results in squirting the soap solution against the outer and inner surfaces of the tumbler.

The soap solution will be thoroughly distributed over the surface of the tumbler and rubbed into the same by means which will shortly be described. Fresh water will then be projected upon the tumbler by the co-action of cam 36 with roller 38 as stated.

Water from a suitable pipe connection 66 is adapted to enter cylinder 40 through threaded connection 67. This opening, however, is closed by piston 39 at all times except when the opening 68, extending through piston 39, is in alignment with opening 67. A pipe connection 69 extends from a threaded opening 70 in the side of the cylinder opposite to that through which threaded opening 67 extends. Pipe 69 extends upwardly through partition 3 and divides into two branches, namely upwardly extending pipe 71 and horizontally extending pipe 72, Fig. 2. Pipe 71 extends upwardly within casing 4 and terminates in a perforated head, similar to the perforated head 63 for the soap solution, this serving to project water on the outside of the tumbler. Similarly pipe 72 extends upwardly within the tumbler parallel to pipe 64 for the soap solution, this serving to project clean water on the inner surface of the tumbler.

When the motor starts in operation, piston 39 will be in its outermost position as shown in Figs. 2 and 6, in which openings 67 and 70 are closed by plunger 39. Cam 36 rotates in counterclockwise direction as shown in Fig. 2, with the result that plunger 39 is forced inwardly, at first slowly and later a little more rapidly because of the increasing eccentricity of the cam. Openings 68 in plunger 39 will begin to uncover openings 67 and 70 at a time shortly after the soap solution has been projected against the tumbler. This fresh water will continue to be sprayed upon the tumbler until opening 68 has completely uncovered ports 67 and 70 of the pipe connections, at which timer roller 38 will drop off of the end 54 of the cam, whereupon spring 55 will immediately force the plunger to its outermost position shown in Fig. 6, shutting off the supply of water. Pipe 73 leads from the end of cylinder 40 to an outlet 74 and serves to carry off the excess or leakage of water in the cylinder 40. Outlet 74 also serves to carry off the water and soap solution which has been sprayed against the tumbler. It will be understood that cylinders 40 and 43 are carried by casing 15.

The means by which the tumbler is held in position, and the arrangement for the brushing means therefor will now be described. Tumblers such as those used in soda water fountains and otherwise are of various shapes and the present invention is designed for use with tumblers of varying shapes. The tumbler shown in the drawings has a conical portion 6ª extending upwardly from its bottom which is succeeded by an outwardly curved portion 6ᵇ. Brush means are provided which will engage on varying surfaces of tumblers having similar shapes or other shapes. In the arrangement shown a brush 75 is mounted upon an L-shaped member 76, which is pivotally connected to the glass support 9 by means of a horizontal pivot 77. The short horizontal upper portion of member 76 carries upwardly directed brush tufts while the longer downwardly extending portion of member 76 carries outwardly directed tufts. A spring 78 is secured to tumbler support 9 and presses outwardly against the downwardly extending portion of member 76. When the tumbler is placed in position, it will rest upon the upwardly directed tufts of the brush 75, while the horizontally directed tufts will engage against the inside surfaces of portions 6ª and 6ᵇ of the tumbler, and spring 78 will force the horizontal portions of the brush outwardly so as to insure contact of the same with the inner surface of the tumbler regardless of the shape of the latter. In case a tumbler is used which does not have the swelling 6ᵇ formed therein, the bristles at the lower part of the brush will be bent inwardly somewhat, by the tumbler, this being permitted by the flexibility of the brush.

The tumbler, as stated, is rotated by the frictional engagement of members 19 therewith, these members 19 bearing against separated portions at one side of the glass. The tumbler is pressed into engagement with members 19 by a roller 79 which engages the glass on the side opposite to that engaged by members 19, referring to Figs. 8 and 9.

Roller 79 is carried by a yoke 80 having downwardly extending arms 81, 81, which are pivoted at the bottom, at 82, to a bracket 83 mounted within the lower portion of the upper chamber 4 of the apparatus. Springs 84, 84, are connected to arms 81 at one end and to fixed points 85 on or adjacent to the bottom of chamber 4 at their other ends, these springs serving to press roller 79 against the tumbler and accordingly to press the tumbler against members 19 by which it is rotated.

Members 19 are preferably so formed as to engage the upper portion of the tumbler as the tumbler is held in inverted position in the machine, members 19 being cut away at their lower portions, as is shown at 86, Fig. 8, so as to accommodate glasses having flares or protuberances, such as swelling 6b on the tumbler shown. Members 19 are also preferably provided with top flanges 19' which are adapted to frictionally engage against the bottom of the tumbler, that is, the upper surface of the inverted tumbler, when the latter is mounted in position, to aid in rotating the tumbler.

The pivoted frame 80, 81 carrying roller 79 may be provided with an upwardly extending arm 87 extending slightly above the top of the apparatus. This arm carries a pad, 87', which may be engaged by the lower edge of the inverted glass, in positioning the glass, to swing frame 81 out of the way.

The brush device which has been described is, of course, for the inside of the glass. If desired, a brush means may additionally be provided for the outside of the glass. Thus a post 90 may carry a horizontally directed brush 88, adapted to engage the top surface of the inverted glass. A brush 89 for the outside peripheral surface of the glass is also shown as supported by the yoke 80, a short post 90 being shown as mounted on yoke 80, to which the brush is secured. Brush 88 is preferably an extension of brush 89. The brush 89 may be formed of a back, preferably flexible, with bristles extending therefrom, as is common, the bristles being of sufficient length and sufficiently flexible, to engage the outside of the tumbler regardless of variations in the shape thereof.

When the glass is to be washed, it will be dropped through the opening 89A in the top 5 of chamber 4. The tumbler may be placed in inverted position on the top 5 and slid over the same until the lower edge of the tumbler engages against pad 87' when the pivoted frame carrying roller 79 will be pressed to one side, and the tumbler will be dropped down into position upon its support. The tumbler will readily pass flanges 19' of members 19, in dropping into position and will be pressed upwardly into contact with flanges 19', by spring 25, when the hand of the operator is taken off the glass. A slight downward pressure of the hand as the glass is thus positioned will serve to cause pin 27 to close circuit for the motor, after which the engagement of roller 45 with surface 51 on lever 46 will keep the motor circuit closed as stated until one revolution of cam shaft 33 has been completed. The tumbler will be rapidly rotated in engagement with the brush 75 while the soap solution is thoroughly scoured into the outer and inner surfaces of the glass after which the glass will be thoroughly rinsed off by the clean water which follows the soap solution. The brush means for the outer surface of the glass may be omitted if desired.

The motor stops at the conclusion of the brief operation, as stated, when the tumbler may be removed from the machine.

It may be noted that the rotating parts may be carried on for a short portion of a revolution by momentum, when the current in the motor has been shut off and this overthrow may be provided for by the provision of short surfaces on cams 36 and 37, in which no rise of the cam takes place such as the surface of cam 36 shown in engagement with roller 38 in Fig. 2.

It should be understood that while the apparatus is shown in the vertical position, it may be arranged in other positions, for example, inclined at an angle, with members 19 beneath the tumbler. This position may render the presence of roller 79 unnecessary, and may also be more convenient for the operator of the apparatus.

It should also be understood that reference to "soap" or the like, in the claims, is to be taken as including equivalent substances having a detergent or cleansing function.

It will be understood that the invention is not limited strictly to the exact details of construction which have been particularly described, but that all reasonable equivalents of the construction particularly described are included within the invention the scope of which is indicated by the appended claims.

I claim:

1. In drinking glass washing apparatus the combination of a glass support, brush means positioned to engage a glass on said support, first means for causing relative movement between said glass and said brush means, a soap solution container, a water supply pipe, second means timed in relation to said first means, and third means actuated by said second means for first projecting a limited quantity of soap solution from said container upon the glass, and for thereafter projecting water from said pipe upon the glass during the continuance of said relative movement.

2. In drinking glass washing apparatus, the combination of means for supporting and rotating a glass, means for projecting soap solution on the glass, means for projecting water on the glass, and means for actuating said soap solution projecting means during a limited rotation of said glass and for thereafter actuating said water projecting means during a following rotation of said glass.

3. In drinking glass washing apparatus the combination of glass supporting means, motive means, motive starting means, a soap solution container, a water supply pipe, timed means automatically operable from said motive means by said starting means, within a limited time from the starting of said motive means, for forcing soap solution over a glass supported by said supporting means, and timed means operable from said motive means for thereafter forcing water over the glass to rinse the same.

4. In drinking glass washing apparatus, the combination of means for rotating a glass about a fixed axis, brush means engaging the glass and means timed with said rotating means and operating automatically in sequence, while the glass is rotating, for squirting soap solution against the glass and for then rinsing it off.

5. In drinking glass washing apparatus, the combination of a support over which an inverted glass is positioned, a pair of members adapted to engage the glass to rotate the same, rollers connected to rotate said members, a pivoted shaft, a roller thereon for engaging said first named rollers, to drive the same, spring means for holding said last named roller in engagement with said first named rollers, a disc on said shaft, a pivoted motor having a shaft, a disc on said motor shaft for driving said first named disc, and spring means for holding said second disc pivotally about said motor pivot in engagement with said first disc.

6. In drinking glass washing apparatus, the combination of a tumbler-supporting post over which an inverted tumbler may be placed, a pair of rotatable members adapted to contact against the outer surface of the tumbler, both at one side of the center line of the tumbler, to rotate the same frictionally, a movable member on the opposite side of the tumbler, a roller carried thereby, adapted to engage the tumbler and press it against said rotatable members, and spring means for pressing said roller against the tumbler.

7. In drinking glass washing apparatus, the combination of a glass support, means for causing rotation of a glass on said support, a cylinder having a piston therein, and having a port for the entry of liquid therein and a connection for the passage of liquid therefrom, means for conducting liquid through said port into said cylinder when said port is not closed by said piston, means timed with said glass rotating means for forcing said piston back to uncover said port and for forcing said piston forward to close said port and eject the liquid through said connection, and means for spraying the liquid, passing through said connection, against the glass, during the rotation of the latter.

8. In drinking glass washing apparatus, the combination of a glass support, brush means, means for causing relative movement between a glass on said support and said brush means, a pair of cylinders with pistons therein and intake and exit ports therein, means for supplying liquid to said intake ports, means for spraying liquid from said exit ports against the glass, and means timed with said relative motion means for sequentially operating said pistons, to cause the piston of one cylinder to uncover the intake port thereof and to then cover the same and force liquid through the exit port thereof, and to then cause the piston of the second cylinder to uncover the intake port thereof and allow liquid to pass through to the exit port thereof and to then cover the same.

In testimony whereof I have signed my name to this specification.

ROBERT R. PARRY.